A. D. CARNAGY.
TORPEDO NET.
APPLICATION FILED MAY 14, 1910.
1,010,858.
Patented Dec. 5, 1911.
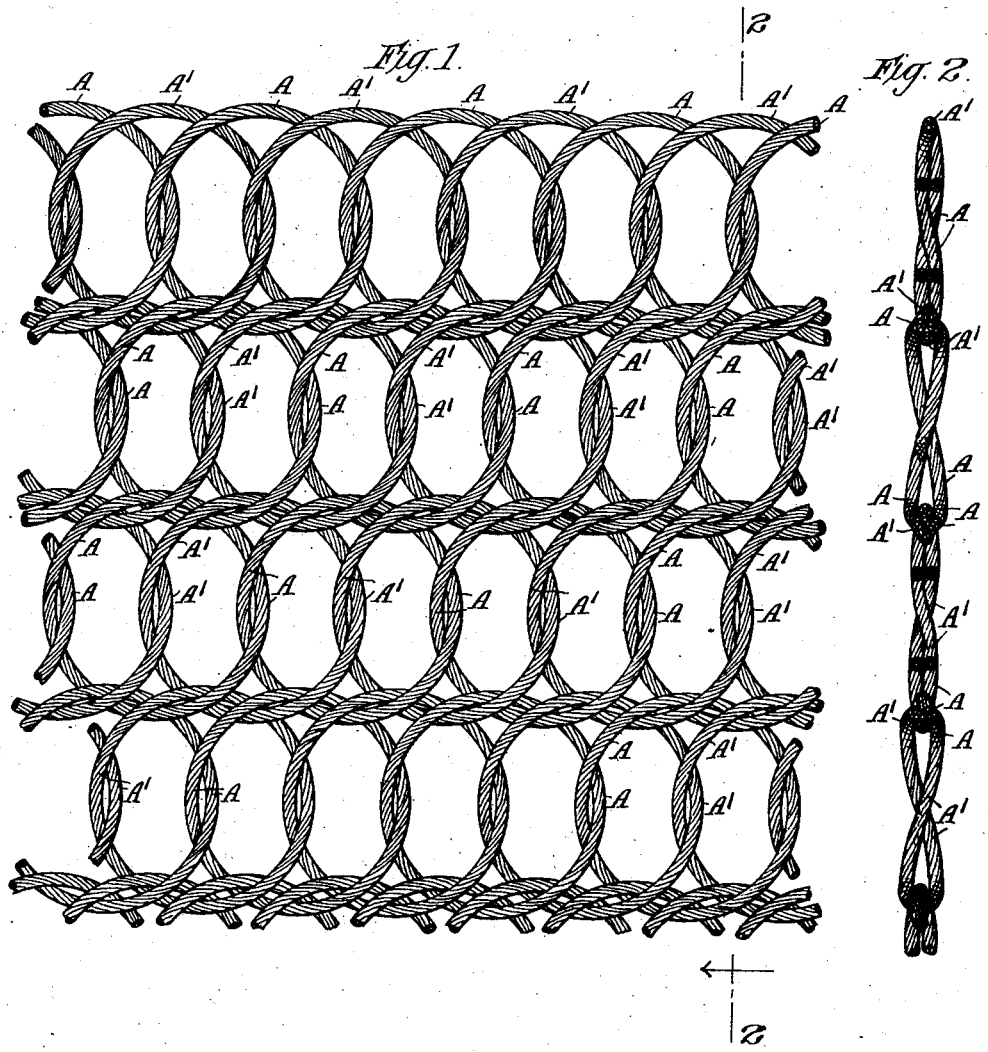

UNITED STATES PATENT OFFICE.

ALFRED D. CARNAGY, OF TRENTON, NEW JERSEY, ASSIGNOR TO JOHN A. ROEBLING'S SONS COMPANY, OF TRENTON, NEW JERSEY, A CORPORATION OF NEW JERSEY.

TORPEDO-NET.

1,010,858.  Specification of Letters Patent.  Patented Dec. 5, 1911.

Application filed May 14, 1910. Serial No. 561,384.

*To all whom it may concern:*

Be it known that I, ALFRED D. CARNAGY, a citizen of the United States, residing at Trenton, county of Mercer, and State of New Jersey, have invented certain new and useful Improvements in Torpedo-Nets, fully described and represented in the following specification and the accompanying drawings, forming a part of the same.

This invention relates particularly to torpedo nets, although nets embodying the invention may be used for other purposes, for instance, as blasting nets, slings and the like.

The invention consists in an improved construction of net employing a series of gromets or rings arranged to secure small openings with comparatively large rings, the especial object of the invention being to provide such a net made entirely of gromets or rings, without connecting links or other members, and which shall be strong and flexible, and simple of manufacture.

In the accompanying drawings forming a part of this specification, a section of a torpedo net embodying the invention is illustrated, and this net will now be described in detail and the features forming the invention then specifically pointed out in the claims.

In the drawings:—Figure 1 is a face view of the net. Fig. 2 is an edge section on the line 2—2 of Fig. 1.

Referring to the drawings, the net is made up of rows of gromets, each row consisting of two sets of gromets or rings A, A' arranged with the gromets of each set interlaced with each other and crossing the gromets of the other set, so as to form a double row of gromets, by which strength and small spaces are secured with comparatively large gromets. These gromets may be made in any suitable manner, but are preferably wire gromets of the construction covered by my prior Patents Nos. 654,224 and 654,225 granted July 24, 1900, and may be of any suitable size. The gromets of each set preferably pass through the gromets of the other set, as shown, so that each gromet bears upon opposite sides of adjacent gromets of the other set, this feature increasing the strength and resistance to side pressure on any of the gromets. The rows of gromets are connected together to form the net by interlacing the gromets themselves, so that no links or other connecting members are used. In the construction shown, the successive rows are connected together by each gromet of one row passing through two adjacent gromets of the next row, a very strong net, with the parts held firmly against sidewise pressure or spreading to permit passage through the net, being thus secured.

The invention provides a strong and light net made wholly of gromets, which does not foul or snarl readily.

What I claim is:—

1. A torpedo net or the like made of rows of gromets with two sets of gromets in each row interlaced with each other to form a double row of gromets with the gromets of the two sets overlapping to reduce the openings through the net, and with the gromets of successive rows interlaced with each other to hold the rows of gromets together.

2. A torpedo net or the like made of rows of gromets with two sets of gromets in each row interlaced with each other to form a double row of gromets with the gromets of the two sets overlapping to reduce the openings through the net and with the gromets of each set passing through adjacent gromets of the other set, and having the gromets of successive rows interlaced with each other to hold the rows of gromets together.

3. A torpedo net or the like made of rows of gromets with two sets of gromets in each row interlaced with each other to form a double row of gromets with the gromets of the two sets overlapping to reduce the openings through the net, and with each gromet of one row passing through two gromets of the next row to hold the rows of gromets together.

In testimony whereof, I have hereunto set my hand, in the presence of two subscribing witnesses.

ALFRED D. CARNAGY.

Witnesses:
N. C. HARRISON,
CHARLES C. COOLEY.

Copies of this patent may be obtained for five cents each, by addressing the "Commissioner of Patents, Washington, D. C."